United States Patent
Chan

(10) Patent No.: US 12,007,486 B2
(45) Date of Patent: Jun. 11, 2024

(54) SYSTEMS AND METHODS FOR SYNCHRONIZING SATELLITE-BASED CLOCK DEVICES

(71) Applicant: Vit Tall LLC, Orlando, FL (US)

(72) Inventor: Steve Chan, Orlando, FL (US)

(73) Assignee: Vit Tall LLC, Orlando, FL (US)

( * ) Notice: Subject to any disclaimer, the term of this patent is extended or adjusted under 35 U.S.C. 154(b) by 390 days.

(21) Appl. No.: 17/455,632

(22) Filed: Nov. 18, 2021

(65) Prior Publication Data

US 2022/0155463 A1     May 19, 2022

Related U.S. Application Data

(60) Provisional application No. 63/115,607, filed on Nov. 18, 2020.

(51) Int. Cl.
    *G01S 19/25*       (2010.01)
    *H04J 3/06*        (2006.01)
    *H04W 56/00*     (2009.01)

(52) U.S. Cl.
    CPC .......... *G01S 19/256* (2013.01); *H04J 3/0644* (2013.01); *H04W 56/0015* (2013.01)

(58) Field of Classification Search
    CPC .. G01S 19/256; H04J 3/0644; H04W 56/0015
    USPC ...................................... 342/357.31
    See application file for complete search history.

(56) References Cited

U.S. PATENT DOCUMENTS

| | | | |
|---|---|---|---|
| 10,324,164 B1* | 6/2019 | Daly ...................... | G01S 7/021 |
| 2020/0220732 A1* | 7/2020 | Shasha ................. | G06Q 10/087 |
| 2021/0231813 A1* | 7/2021 | Camparo ........... | H04B 7/18521 |

FOREIGN PATENT DOCUMENTS

CN          109548135 A    *    3/2019     .......... H04J 3/0664

* cited by examiner

*Primary Examiner* — Harry K Liu
(74) *Attorney, Agent, or Firm* — ARENTFOX SCHIFF LLP

(57) ABSTRACT

The present disclosure provides methods and systems for improving the time synchronization of global positioning system (GPS) satellite systems and related methods of using such systems. In some aspects, the GPS satellite systems comprise a swarm of CubeSat or other small form factor satellites.

21 Claims, 6 Drawing Sheets

SYSTEMS AND METHODS FOR SYNCHRONIZING SATELLITE-BASED CLOCK DEVICES

CROSS-REFERENCE TO RELATED APPLICATION

This application claims priority to U.S. Provisional Patent Application No. 63/115,607, which was filed on Nov. 18, 2020, the entire contents of which is incorporated herein by reference in its entirety.

TECHNICAL FIELD

This disclosure generally relates to methods for synchronizing clock devices, as well as applications of such methods for the synchronization of satellite-based clock devices.

BACKGROUND

In recent years, the U.S. military has become increasingly reliant on space-based assets, such as the U.S. global positioning system (GPS). Civilians have also come to rely upon the GPS network for basic navigation. Unfortunately, current space-based assets lack a robust capability to respond to an increasing number of threats (e.g., intentional space garbage, weaponized satellites, cyber-attacks, missiles, directed energy weapons, etc.), and no robust response actions can be perfectly operationalized. Accordingly, U.S. space-based assets such as the GPS satellite network remain vulnerable to attacks by rival nations (e.g., direct attacks using space or land-based weapons, as well as jamming attacks intended to spoof or disrupt GPS signals within a localized region). Moreover, the GPS system currently relies on a legacy network comprised of aging and underfunded satellites as well as ground-based equipment. In view of these emerging threats and the gradual obsolescence of existing GPS satellites, there exists a need for a modern alternative, and in particular, for a more accurate and resilient system that can provide Assured Position, Navigation and Timing (A-PNT) capabilities for military and civilian use.

SUMMARY OF THE DISCLOSURE

In a general aspect, the disclosure provides methods and systems for managing and/or synchronizing a plurality of satellite-based clock devices, e.g., to provide A-PNT capabilities. The present methods and systems may be implemented using a network of satellites (e.g., CubeSats), in order to provide a backup or replacement for the aging constellation of satellites currently used to maintain the GPS network. In some aspects, the disclosed methods and systems improve upon known alternatives by providing a more secure and cost-effective option for supplementing the conventional GPS network. For example, multiple CubeSats can be delivered to orbit using a single commercial rocket launch, reducing costs. Moreover, the clock synchronization methods described herein may be used to improve the accuracy of the GPS network, by ensuring that the most accurate clock device available on a satellite within the network is identified as the grand master clock and used to generate a GPS signal.

In a first general aspect, the disclosure provides a method for managing a plurality of satellites, comprising: providing the plurality of satellites, wherein each satellite comprises a clock device, and a communications system configured to allow communications with one or more other satellites selected from the plurality of satellites; assigning each of the plurality of clock devices to a clock group, wherein there are at least three clock groups; receiving clock data from a subset of the plurality of clock devices located on the plurality of satellites; selecting a group election logic for each clock group; for each clock group, applying the group election logic to the received clock data corresponding to that clock group to select a group best clock and storing each selected group best clock in a set of group best clocks; selecting a master election logic; and applying the master election logic to the set of group best clocks to select a grand master clock device.

In some aspects, the communications system of one or more of the plurality of satellites is configured to transmit and/or receive signals using a $K_a$ band frequency within the range of 26.5-40 gigahertz. For example, the receiving step of the aforementioned method may be performed by a satellite selected from the plurality of satellites, which has a communications system configured to receive signals from other satellites using a $K_a$ band frequency.

In some aspects, one or more of the plurality of satellites further comprises one or more magnetorquers configured to provide attitude control, detumbling, and/or stabilization of the respective satellite. In some aspects, the satellite selected from the plurality of satellites which comprises the selected grand master clock device may be used to broadcast a GPS signal and/or for synchronizing the some or all of the remaining plurality of clock devices installed on other satellites.

In some aspects, the group election logic comprises a Q-input harmonization algorithm or is selected based on available processing time. In some aspects, applying the master election logic to the set of group best clocks to select a grand master clock device comprises selecting the clock device with the median time value from the set of group best clocks. In other aspects, electing the grand master clock comprises calculating an average time value from the clock data in the master clock group and selecting the clock device with the value closest to the average. In some aspects, the present methods further include a step of verifying the integrity of a message from the grand master clock.

In another general aspect, the disclosure provides a method for synchronizing a plurality of clock devices, comprising: providing a plurality of satellites, wherein each satellite comprises a clock device, and a communications system configured to allow communications with one or more other satellites selected from the plurality of satellites; receiving clock data from a subset of the plurality of clock devices located on the plurality of satellites; grouping the clock devices into clock groups; selecting a group best clock for each group using a first selection process and providing a set of group best clocks; selecting a master clock group based on the set of group best clocks using a second selection process; selecting a grand master clock from the master clock group using a third selection process; and synchronizing the plurality of clock devices to the grand master clock; wherein the first selection process and second selection process use different selection algorithms.

In some aspects, the first selection process is a Q-input harmonization algorithm and the second selection process is a fault-tolerant average algorithm. The third selection process may be the Enhanced Best Master Algorithm. In still further aspects, the first selection process comprises: setting an accuracy threshold; selecting a candidate group best clock by applying the Enhanced Best Master Algorithm to the clock data corresponding to the clock devices in a given group; electing a reference value using a Q-input harmonization algorithm; comparing the candidate group best clock to the reference value; and returning the candidate group best clock if the comparison between the candidate group best clock and the reference value is less than the accuracy threshold; the second selection process comprises selecting the clock group corresponding to the clock device with the median time value from the set of group best clocks; and the third selection process comprises applying the Enhanced Best Master Algorithm to the master clock group. In some aspects, the accuracy threshold is a preset value.

In any of the methods or systems described herein, some or all of the plurality of satellites may comprise a CubeSat or another small form factor satellite. CubeSats are built to standard dimensions (Units or "U") of 10 cm×10 cm×10 cm. They can be, e.g., 1U, 2U, 3U, or 6U.

In another general aspect, the disclosure provides a time-synchronizing GPS satellite network, comprising: a plurality of satellites, wherein each satellite comprises a clock device, and a communications system configured to allow communications with one or more other satellites selected from the plurality of satellites; wherein one satellite selected from the plurality of satellites is a time controller configured to assign each of the plurality of clock devices to a clock group, wherein there are at least three clock groups; receive clock data from a subset of the plurality of clock devices located on the plurality of satellites; select a group election logic for each clock group; for each clock group, apply the group election logic to the received clock data corresponding to that clock group to select a group best clock and storing each selected group best clock in a set of group best clocks; select a master election logic; and apply the master election logic to the set of group best clocks to select a grand master clock device. wherein the groups are assigned to correspond to the plurality of satellites. In some aspects, the time controller is configured to: apply a group election logic comprising an Q-input harmonization algorithm; and select a grand master clock device by selecting the clock device with the median time value from the set of group best clocks.

Additional aspects will be readily apparent to one of skill in light of the totality of the disclosure.

DETAILED DESCRIPTION

Figure 1:
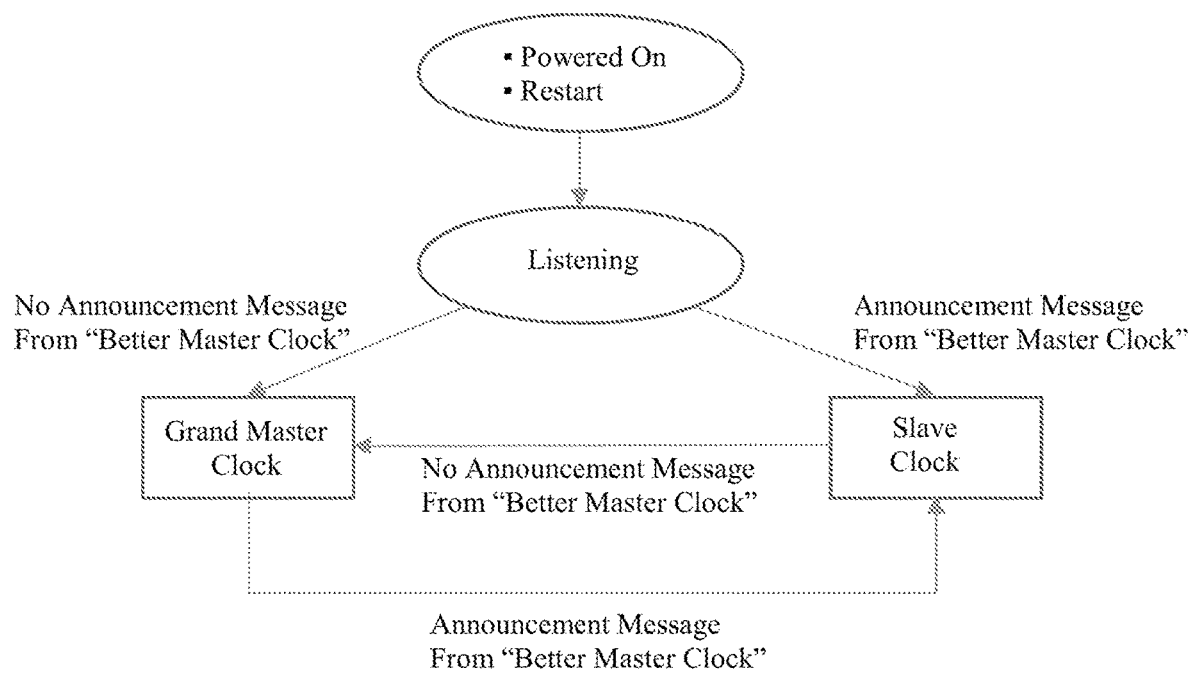
FIG. 1 is a state diagram showing the Enhanced Best Master Algorithm (EBMA), as this algorithm is known in the art.

Exemplary aspects of the disclosure are described herein in the context of methods and systems for managing and/or synchronizing clock devices incorporated into a plurality of satellites, e.g., to provide A-PNT capabilities. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying, drawings. The same reference indicators will be used to the extent possible throughout the drawings and the following description to refer to the same or like items.

In a general aspect, the methods and systems described herein require a plurality of satellites, wherein each satellite comprises at least one clock device (e.g., a cesium oscillator) and a communications system configured to allow each satellite to communicate with one or more of the remaining plurality of satellites. In doing so, a mesh network can be created whereby the individual satellites can communicate with each other (e.g., using one or more $K_a$ band frequencies) to manage and/or synchronize their clock devices. This configuration is advantageous because it provides a resilient network that can detect and compensate for attacks and isolated technical failures. For example, the synchronization methods described herein may be used to detect that the clock device integrated into a given satellite within the network is producing anomalous readings compared to the majority of other clock devices integrated into the plurality of satellites.

In some aspects, the plurality of satellites may be configured to engage in individual or collaborative swarm reconfiguration and movement planning. For example, one or more of the satellites in the plurality of satellites forming the network may comprise onboard magnetorquers which allow the respective satellite(s) to shift from a low-drag to a high-drag state. The configuration of the swarm may be adjusted for a variety of reasons. For example, a satellite may be moved into a new position to provide a stronger GPS signal in a given area or to replace a satellite that has failed due to a hardware failure or damage (e.g., caused by debris or an anti-satellite directed energy weapon). Members of the swarm may also be repositioned, in some instances, for defensive reasons. For example, a satellite may be used to block debris.

The communications system incorporated into each of the plurality of satellites may be configured to allow for intra-swarm communication using a variety of frequencies. However, in some aspects it is envisioned that inter-satellite communications between members of the swam will utilize $K_a$ band frequencies (e.g., 26.5-40 gigahertz). In some aspects, the communications system will incorporate a GPS antenna allowing one or more of the plurality of satellites to broadcast a GPS (or any other A-PNT signal capable of being used for a navigation or positioning system).

Figure 2:
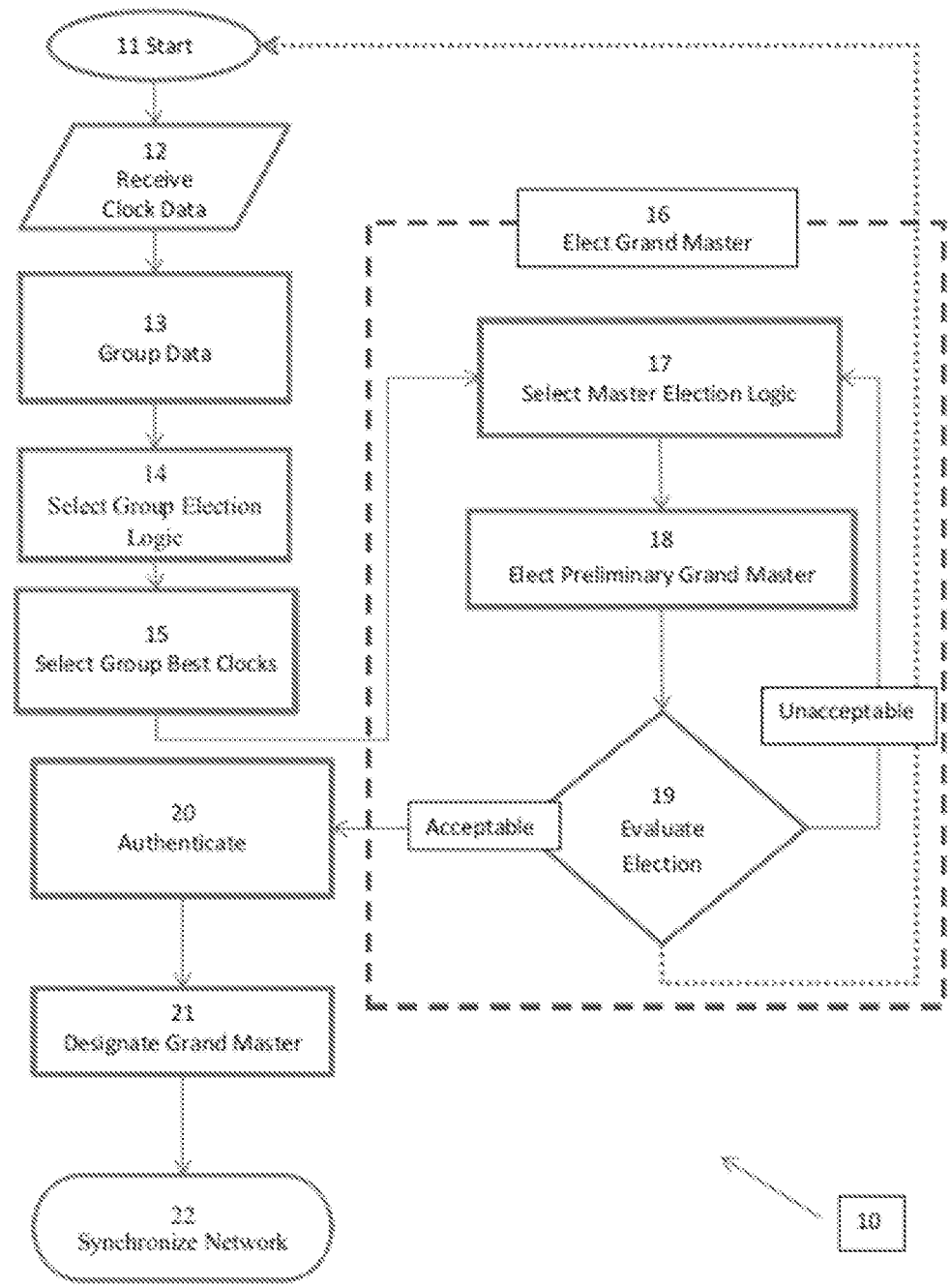
FIG. 2 is a diagram of an inventive method for synchronizing clock devices.

It is understood that the synchronization of clock devices incorporated into the plurality of satellites may be carried out using several different algorithms. As illustrated in FIG. 2, an inventive method 10 provides for nested selection of a grand master clock from among several clock devices, beginning in step 11. In step 12, clock data is received from the several (P) clock devices. The clock devices (and/or their corresponding data) are categorized or assigned into K groups in step 13. For example, FIG. 5 (discussed further below) illustrates three groups of two devices in a specific implementation. Although not shown in FIG. 2, the order of steps 12 and 13 may be reversed, such that the groupings are preselected prior to receiving the corresponding clock data. It is also contemplated that the groups need not have the same size (population), and may be classified or arranged based on pre-selected characteristics (e.g., clock devices at the same location or in close proximity), algorithmically selected (e.g., groupings based on an evaluation or comparison of the clock data received), or randomly or arbitrarily grouped. However, preferably, each group has more than one member.

In step 14, a group election logic is selected for each clock group. The group election logic may be, but is not necessarily, the same for each clock group. The selection may be based various factors, including but not limited to a preset sequence of algorithms, the time and/or computing resources available, the size of the group, known communication delays in the group, prior selection/election as the master clock group and/or grand master clock (discussed further below), and/or combinations thereof. In some embodiments, multiple election logics are chosen and the results of those processes may be compared and evaluated as part of the application in step 15.

Figure 3:
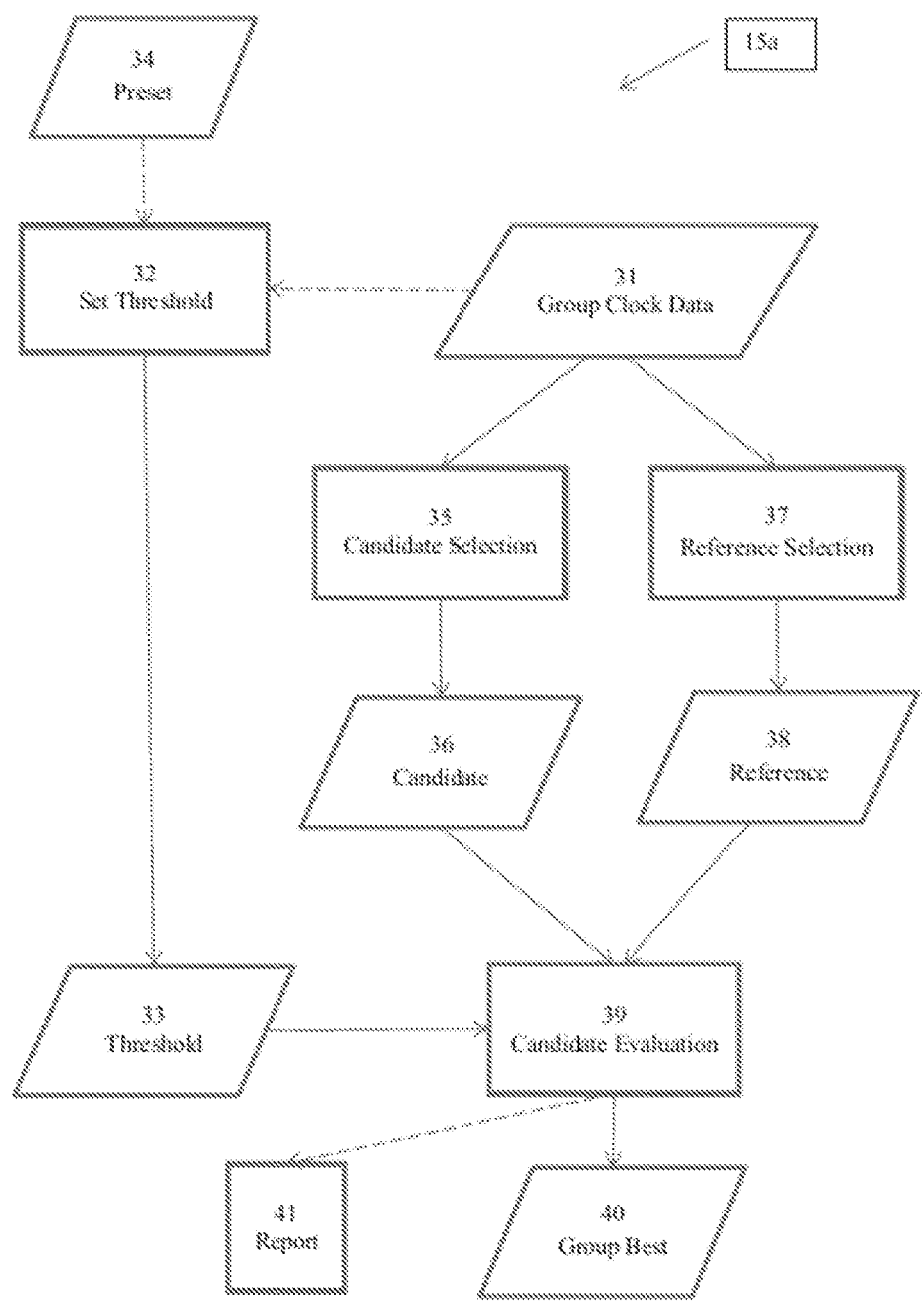
FIG. 3 is a diagram of a first exemplary aspect of a section of the method of FIG. 2.

In step 15, K group best clocks are selected from among the devices in each group. In one embodiment, step 15 employs a Q-input harmonization algorithm (QIHA), such as described via Section VIII in S. Chan, P. Thonginta, P. Nopphawan, and I. Oktavianti, "Sparse Data Proxy Actuation for the Electrical Grid: Proxy Utilization with a Q-Input Harmonization Method for System Estimation," IEEE 10$^{th}$ Annual Information Technology, Electronics and Mobile Communication Conference (2019), or an N-input voting algorithm (NIVA), such as the algorithm described in A. Karimi, F. Zarafshan, A. Ramli, "A Novel N-input voting algorithm for X-by-Wire Fault Tolerant Systems," *Scientific World Journal* (2014), which are both incorporated herein by reference. Alternatively, step 15 may employ an elastic command and control (C2) methodology that equates to an enhanced best master algorithm (EBMA), such as described in FIGS. 8, 9, and 10 in S. Chan, "Prototype Resilient Command and Control (C2) of C2 Architecture for Power Outage Mitigation," IEEE 10th Annual Information Technology, Electronics and Mobile Communication Conference (2019), the entire contents of which is incorporated by reference, or the Best Master Clock Algorithm (BMCA) as described in IEEE 1588-2008 and above in connection with FIG. 1. In a preferred embodiment, the EBMA and QIHA are combined in step 15, such the QIHA operates as a reasonableness and accuracy check on the results of the EBMA. For example, as seen in FIG. 3, the method 15a of manipulating the group clock data 31 can include the step 32 of setting an accuracy threshold 33, for example by having a pre-set threshold 34 or by calculating a threshold based on a subset of the clock data 31. For example, the distribution and deviation among clock values can be used to calculate a threshold 33. In candidate selection step 35, the traditional EBMA is applied to the group of clock data 31 to produce a candidate group master 36. In reference selection step 37, a QIHA is applied to the data group 31 to produce a vote result or reference value 38, which is then compared to the candidate group master 36 in step 39. If the comparison is within the accuracy threshold 33, then the candidate 36 is designated the group best clock 40. If the comparison exceeds the accuracy threshold, the process can return to a prior step for another attempt (e.g., by polling and receiving a fresh set of clock data from the clocks in the group) or the method 30 can output an empty or null result as the group best clock 40. As the group best clock 40 is used in a later selection process among all the group best clocks (see FIG. 2), a failure to produce a reasonable best clock in any given group does not prevent completion of the broader method. Alternatively, in the event of an unfavorable evaluation of the candidate, the vote result 38 can be designated as the group best clock 40. Optionally, the method can include a reporting step 41, particularly where the evaluation 39 results in rejection of candidate 36, or if there are errors in producing a reference value 38 from the QIHA. Those errors may indicate widespread problems in the clock devices of group requiring attention from a system administrator.

Figure 4:
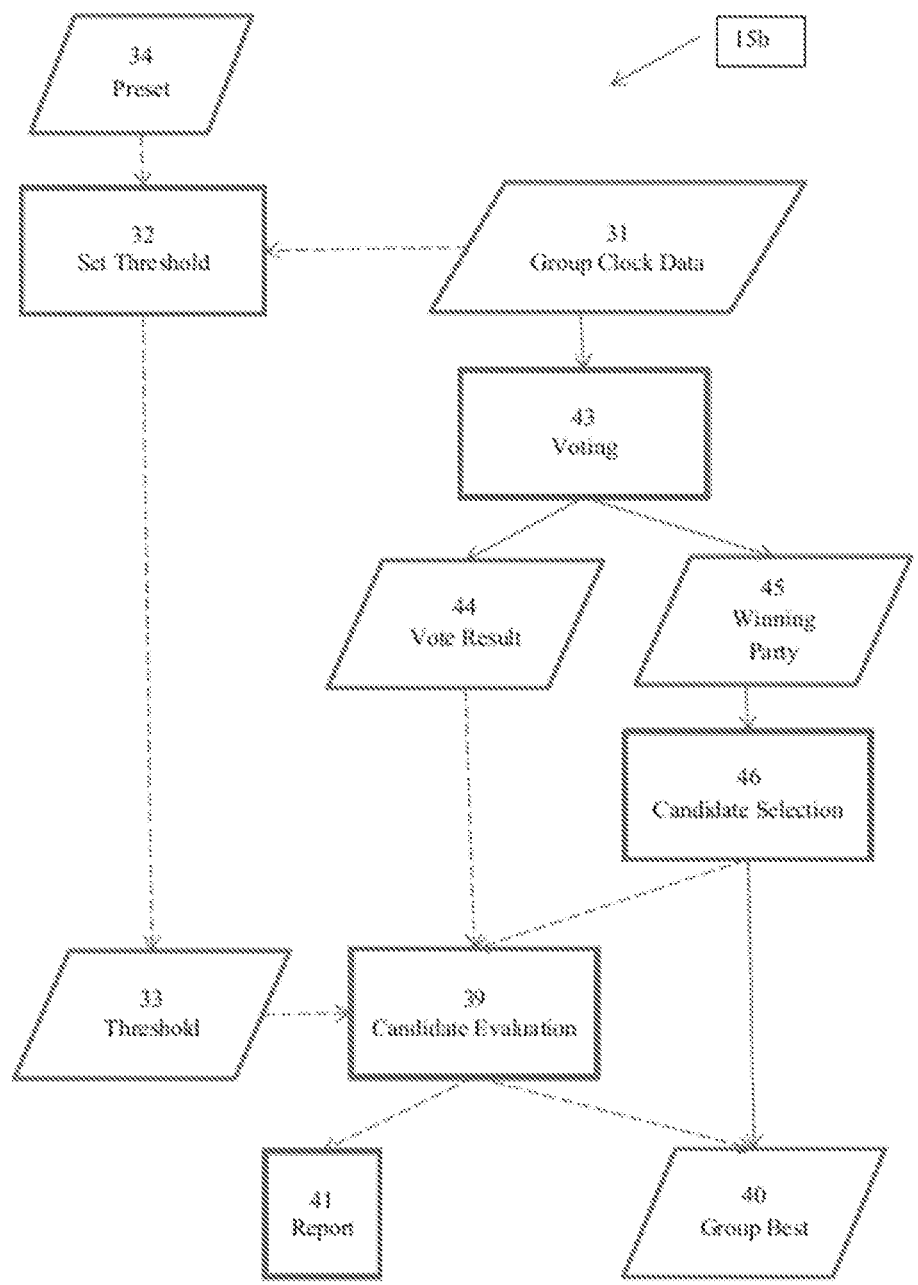
FIG. 4 is a diagram of a second exemplary embodiment of a section of the method of FIG. 2.

In another embodiment of step 15, method 15b seen in FIG. 4, the EBMA and QIHA applications can be sequenced. Group clock data 31 is input to the QIHA in voting step 43. The output of the QIHA may include the elected result or vote value 44, in addition to the set of inputs 45 that resulted in that result 45. For example, the vote result 44 from an election algorithm will be selected from multiple values that are within the sameness or voting threshold $\tau$ (referring to the nomenclature of the A. Karimi reference above). Those multiple values are the cohort of winning inputs 45. Then the EBMA may be used in step 46 to select the "best" clock from within the wining cohort 45 and output that as the group best clock 40. Optionally, method 14b can use the threshold and evaluation steps 32, 39 similar to FIG. 3, where the vote result 44 is compared to the output of the candidate selection step 46; however, in such an embodiment, if threshold 33 is greater than the voting threshold $\tau$, then the evaluation 39 will always result in a successful comparison because the winning cohort 45 are all within $\tau$ of the vote value 44 by definition.

However, returning to FIG. 2, other selection criteria can be used in step 15. For example, group best clocks can be selected based on their proximity to a prior grand master clock or other historical accuracy measurements. The clock data may include information that compares the device's drift from the synchronized system time or another time source, thereby providing additional criteria for differentiating the clock data within the group. Still other factors, such as power or network interruptions of a given clock device, may be used to score a given clock and/or taken into account in the selection of the best group clock in step 15. These criteria may be deployed in an independent selection method, or may be incorporated into the heuristic properties used in the EBMA, or in other similar algorithms.

Figure 6:
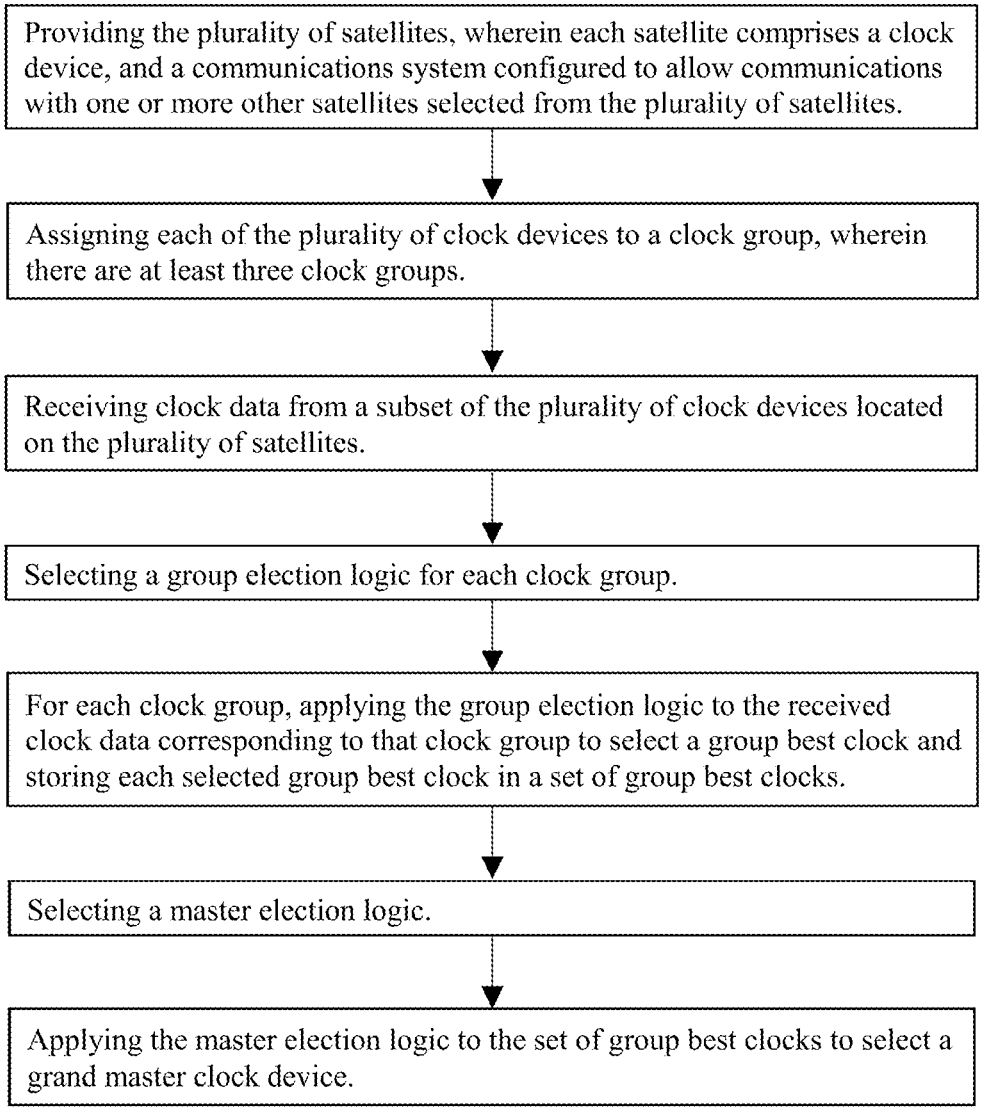
FIG. 6 is a flowchart showing an exemplary method according to the disclosure.

A grand master clock is elected from the group best clocks in election process 16. In election process 16, the first step 17 is selection of a master election logic. In election step 18, a preliminary grand master is selected from the group best clocks in accordance with the selected election logic. In step 19, the reasonableness of the preliminary grand master is evaluated. If the evaluation in step 19 is acceptable, the method 10 continues to optional authentication step 20, formal grand master designation step 21, and network synchronization step 22, as discussed further below. If the evaluation in step 19 indicates that the preliminary grand master is unacceptable, the process 10 may return to selecting the election logic at 17, or to an earlier step such as reshuffling the groupings in step 13, or even return to start step 11 and recollect new clock data from the P clock devices or a subset thereof. The grand master election of steps 17-19 can therefore be iterated until an acceptable preliminary grand master is elected. A particular implementation of grand master election is discussed further in connection with FIG. 6, below.

At authentication step 20, an integrity protection mechanism utilizes a Message Authentication Code (MAC) and symmetric encryption to verify that messages (including time synchronization packets) have not suffered unauthorized modification in transit, similar to and as suggested by Annex K of IEEE 1588-2002. If the authentication between the preliminary grand master and the selector device (and/or a slave clock) fails, the slave clock(s) will not accept the new master clock information. At that point, the authentication step 20 can be attempted again, or the method 10 can return to some prior step, even as far back as start step 11. If the authentication step 20 is successful, the preliminary grand master is formally designated as the grand master clock in designating step 21. Then, in step 22, the clock devices of the network synchronize to the grand master clock, for example using conventional techniques such as PTP and IEEE 1588-2008. Optionally and preferably, another integrity protection mechanism and/or security protocol is utilized prior to the syndication of the grand master clock information to the rest of the network in step 22.

Synchronization methods 10 may be implemented in one or more devices. For example, the clock groups could select their group best clocks independently and report only the group best clock to a central time controller device for further election of the grand master clock in process 16. Such an implementation may reduce network resources required to transmit the full set of various clock data to a central controller. Alternatively, a central controller can receive all of the clock data and perform the intermediate steps before engaging in any communications with the separate networked devices in steps 20 and/or 22.

Figure 5:
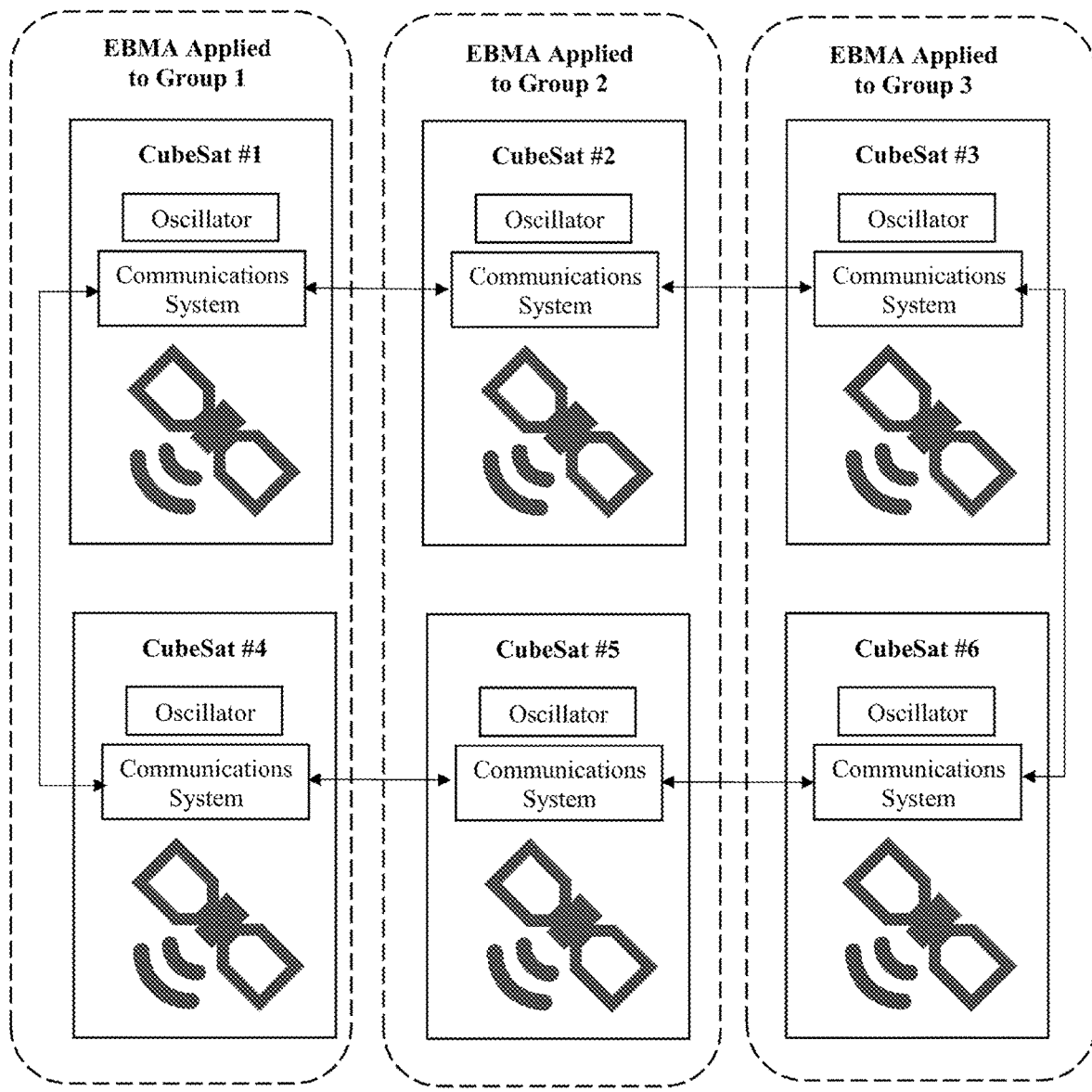
FIG. 5 is a diagram showing an exemplary relationship among a plurality of satellites with clock devices synchronized using the method of FIG. 2.

FIG. 5 is a diagram showing an exemplary relationship among a plurality of satellites with clock devices synchronized using the method of FIG. 2. As shown by this figure, each of the six satellites in this example have an integrated cesium oscillator as a clock device. Pursuant to the algorithm shown in FIG. 2, these satellites have been logically arranged into three clock device groups. It is understood that these device groupings are illustrative and other combinations may be used. The group clock data for these three clock device groups can be evaluated in multiple ways, for example using the EBMA to produce a candidate and a reference value by QIHA, which are then compared in an evaluation step to produce a group best clock, as discussed above more fully in connection with FIGS. 3 and 4. Again, these steps may be implemented in the same processing device or distributed among multiple devices.

The implementation described in FIG. 5, as applied, may correct for faults in individual devices and provide a more robust timekeeping synchronization service. Suppose that oscillator of CubeSat #1 self-reports that it is the most-accurate according to its "Announce" message under the EBMA and becomes the group best candidate pursuant to the selection step, but this oscillator is actually offset and drifting from the other clock devices. Meanwhile, the oscillator of CubeSat #4 may be in close agreement, such that they are the QIHA-selected reference. If the difference between the oscillator of CubeSat #1 and the QIHA-generated value exceed the reasonableness threshold, the QIHA-generated value can be substituted as the ground best clock or, at a minimum, the oscillator of CubeSat #1 may be rejected from further candidacy in the broader system. This scenario is exemplary and not limiting, and the disclosed synchronization system and methods may provide benefits in other error conditions, as well.

Further descriptions relating to certain embodiments may be found in the inventor's work, Chan S. (2020), *A Potential Cascading Succession of Cyber Electromagnetic Achilles' Heels in the Power Grid* (in: Arai K., Bhatia R. (eds) *Advances in Information and Communication*. FICC 2019. Lecture Notes in Networks and Systems, vol 70. Springer), which is incorporated herein by reference in its entirety.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

The invention claimed is:

1. A method for managing a plurality of satellites, comprising:
   providing the plurality of satellites, wherein each satellite comprises a clock device, and a communications system configured to allow communications with one or more other satellites selected from the plurality of satellites;
   assigning each of the plurality of clock devices to a clock group, wherein there are at least three clock groups;
   receiving clock data from a subset of the plurality of clock devices located on the plurality of satellites;
   selecting a group election logic for each clock group;
   for each clock group, applying the group election logic to the received clock data corresponding to that clock group to select a group best clock and storing each selected group best clock in a set of group best clocks;
   selecting a master election logic; and
   applying the master election logic to the set of group best clocks to select a grand master clock device.

2. The method of claim 1, wherein the communications system of one or more of the plurality of satellites is configured to transmit and/or receive signals using a $K_a$ band frequency within the range of 26.5-40 gigahertz.

3. The method of claim 1, wherein the receiving step is performed using a $K_a$ band frequency within the range of 26.5-40 gigahertz.

4. The method of claim 1, wherein one or more of the plurality of satellites further comprises at least one magnetorquer configured to provide attitude control, detumbling, and/or stabilization of the respective satellite.

5. The method of claim 1, further comprising:
   broadcasting a GPS signal, by a satellite selected from the plurality of satellites which comprises the selected grand master clock device.

6. The method of claim 1, further comprising synchronizing the plurality of clock devices to the grand master clock device.

7. The method of claim 1, wherein the group election logic comprises a Q-input harmonization algorithm.

8. The method of claim 1, wherein applying the master election logic to the set of group best clocks to select a grand master clock device comprises selecting the clock device with the median time value from the set of group best clocks.

9. The method of claim 1, wherein electing the grand master clock comprises calculating an average time value from the clock data in the master clock group and selecting the clock device with the value closest to the average.

10. The method of claim 1, further comprising verifying the integrity of a message from the grand master clock.

11. The method of claim 1, wherein the group election logic is selected based on available processing time.

12. The method of claim 1, wherein at least some of the satellites in the plurality of satellites are CubeSats.

13. The method of claim 1, wherein all of the satellites in the plurality of satellites are CubeSats.

14. A method for synchronizing a plurality of clock devices, comprising:
 providing a plurality of satellites, wherein each satellite comprises a clock device, and a communications system configured to allow communications with one or more other satellites selected from the plurality of satellites;
 receiving clock data from a subset of the plurality of clock devices located on the plurality of satellites;
 grouping the clock devices into clock groups;
 selecting a group best clock for each group using a first selection process and providing a set of group best clocks;
 selecting a master clock group based on the set of group best clocks using a second selection process;
 selecting a grand master clock from the master clock group using a third selection process; and
 synchronizing the plurality of clock devices to the grand master clock;
 wherein the first selection process and second selection process use different selection algorithms.

15. The method of claim 14, wherein the first selection process is an Q-input harmonization algorithm and the second selection process is a fault-tolerant average algorithm.

16. The method of claim 14, wherein the third selection process is the Enhanced Best Master Algorithm.

17. The method of claim 14, further comprising verifying the integrity of a message from the grand master clock.

18. The method of claim 14, wherein:
 the first selection process comprises: setting an accuracy threshold; selecting a candidate group best clock by applying the Enhanced Best Master Algorithm to the clock data corresponding to the clock devices in a given group; electing a reference value using an Q-input harmonization algorithm; comparing the candidate group best clock to the reference value; and returning the candidate group best clock if the comparison between the candidate group best clock and the reference value is less than the accuracy threshold;
 the second selection process comprises selecting the clock group corresponding to the clock device with the median time value from the set of group best clocks; and
 the third selection process comprises applying the Enhanced Best Master Algorithm to the master clock group.

19. The method of claim 18, wherein the accuracy threshold is a preset value.

20. A time-synchronizing GPS satellite network, comprising:
 a plurality of satellites, wherein each satellite comprises a clock device, and a communications system configured to allow communications with one or more other satellites selected from the plurality of satellites;
 wherein one satellite selected from the plurality of satellites is a time controller configured to
  assign each of the plurality of clock devices to a clock group, wherein there are at least three clock groups;
  receive clock data from a subset of the plurality of clock devices located on the plurality of satellites;
  select a group election logic for each clock group;
  for each clock group, apply the group election logic to the received clock data corresponding to that clock group to select a group best clock and storing each selected group best clock in a set of group best clocks;
  select a master election logic; and
  apply the master election logic to the set of group best clocks to select a grand master clock device, wherein the groups are assigned to correspond to the plurality of satellites.

21. The system of claim 20, wherein the time controller is configured to:
 apply a group election logic comprising an Q-input harmonization algorithm; and
 select a grand master clock device by selecting the clock device with the median time value from the set of group best clocks.

* * * * *